(12) United States Patent
Alonso Tabares

(10) Patent No.: US 11,209,826 B2
(45) Date of Patent: Dec. 28, 2021

(54) ANTI-COLLISION AIRPORT SYSTEM

(71) Applicant: Airbus (S.A.S.), Blagnac (FR)

(72) Inventor: Diego Alonso Tabares, Toulouse (FR)

(73) Assignee: Airbus (S.A.S.), Blagnac (FR)

( * ) Notice: Subject to any disclaimer, the term of this patent is extended or adjusted under 35 U.S.C. 154(b) by 234 days.

(21) Appl. No.: 16/449,046

(22) Filed: Jun. 21, 2019

(65) Prior Publication Data
US 2019/0391586 A1 Dec. 26, 2019

(30) Foreign Application Priority Data

Jun. 25, 2018 (FR) ........................................ 1855621

(51) Int. Cl.
| | | |
|---|---|---|
| *G05D 1/02* | (2020.01) | |
| *G06F 16/903* | (2019.01) | |
| *G08G 1/16* | (2006.01) | |
| *G08G 7/02* | (2006.01) | |
| *H04L 29/08* | (2006.01) | |

(52) U.S. Cl.
CPC ......... *G05D 1/0214* (2013.01); *G05D 1/0276* (2013.01); *G06F 16/90335* (2019.01); *G08G 1/162* (2013.01); *G08G 7/02* (2013.01); *G05D 2201/02* (2013.01); *H04L 67/12* (2013.01)

(58) Field of Classification Search
CPC ............. G05D 1/0214; G05D 2201/02; G05D 1/0276; H04L 67/12; G08G 7/02; G08G 1/162; G06F 16/90335
See application file for complete search history.

(56) References Cited

U.S. PATENT DOCUMENTS

| | | | | |
|---|---|---|---|---|
| 5,014,935 A | * | 5/1991 | Dalbera | .................... B64C 1/22 |
| | | | | 244/137.1 |
| 2010/0063650 A1 | * | 3/2010 | Vian | ........................ B64F 5/60 |
| | | | | 701/2 |

(Continued)

FOREIGN PATENT DOCUMENTS

| | | |
|---|---|---|
| GB | 2 542 395 A | 3/2017 |
| WO | WO 2018/034615 A1 | 2/2018 |

OTHER PUBLICATIONS

French Search Report for Application No. 1855621 dated Mar. 1, 2019.

*Primary Examiner* — Hunter B Lonsberry
*Assistant Examiner* — Mathew Franklin Gordon
(74) *Attorney, Agent, or Firm* — Jenkins, Wilson, Taylor & Hunt, P.A.

(57) ABSTRACT

Anti-collision airport system including a motorized mobile device to be moved close to an aircraft. The system includes a database to record structural characteristics of categories of aircraft and structural characteristics of the motorized mobile device. The controller is configured to identify a category corresponding to the aircraft and a positioning of the motorized mobile device with respect to the aircraft, search and retrieve, from the database, structural characteristics associated with the category corresponding to the aircraft and structural characteristics of the motorized device, calculate a trajectory for the movement of the motorized mobile device on the basis of the structural characteristics of the aircraft and of the motorized mobile device and of the positioning of the motorized mobile device with respect to the aircraft, and control the motorized mobile device according to the calculated trajectory.

16 Claims, 1 Drawing Sheet

(56) References Cited

U.S. PATENT DOCUMENTS

| | | | |
|---|---|---|---|
| 2011/0015816 A1* | 1/2011 | Dow | G05D 1/0278 |
| | | | 701/23 |
| 2015/0367960 A1 | 12/2015 | Dyanzio et al. | |
| 2016/0054443 A1 | 2/2016 | Mallaghan | |
| 2019/0176281 A1* | 6/2019 | Hafenrichter | B64F 5/60 |
| 2019/0256226 A1* | 8/2019 | Shapoury | B60L 53/30 |

* cited by examiner

ANTI-COLLISION AIRPORT SYSTEM

CROSS-REFERENCE TO RELATED APPLICATION

This application claims priority to French patent application number 18 55621 filed on Jun. 25, 2019, the entire disclosure of which is incorporated by reference herein.

TECHNICAL FIELD

The disclosure herein relates to an airport system comprising a motorized mobile device intended to be moved close to an aircraft without colliding with the aircraft.

BACKGROUND

When an aircraft is stationary on the apron of an airport, a large number of motorized mobile devices (frequently referred to as ground support equipment) such as baggage dollies, boarding stairs and/or supply vehicles are brought close to the aircraft. This ground support equipment may be driven by an airport operative, pulled by a tractor vehicle driven by the airport operative, or move around the aircraft autonomously following a predefined trajectory. It is important to avoid any risk of collision between the equipment and the aircraft.

The dimensions of an aircraft depend on its category and/or model. For example, within a single category of aircraft, the wingspan may be 29 meters, 34 meters or 36 meters. Moreover, an aircraft may present in various configurations. Indeed, the aircraft comprises movable elements such as slats or flaps which may be retracted or deployed and doors which may be open or closed, etc. In the retracted position, the slats or flaps of the wings may allow a supply vehicle to pass underneath the wings, whereas in the deployed position the slats or flaps may prevent the passage of the vehicle, boarding stairs may dock with the aircraft only if the door of the aircraft is closed, a container loader may dock with the aircraft only if the cargo door is open, etc. In order to be able to use ground support equipment, in particular autonomous ground support equipment, there is a need to be able to control this equipment so as to avoid a risk of collision with the aircraft, whatever the category and configuration of the aircraft, in particular the configuration of the movable elements.

SUMMARY

A particular aim of the disclosure herein is to provide a solution to this problem. It relates to an anti-collision airport system comprising a motorized mobile device and a controller for the motorized mobile device, the motorized mobile device being intended to be moved close to an aircraft. The system is noteworthy in that it comprises a database configured to record structural characteristics of categories of aircraft and structural characteristics of the motorized mobile device, and in that the controller is configured to:
 identify a category corresponding to the aircraft and a positioning of the motorized mobile device with respect to the aircraft;
 search and retrieve, from the database, structural characteristics associated with the category corresponding to the aircraft and structural characteristics of the motorized device;
 calculate a trajectory for the motorized mobile device on the basis of the structural characteristics of the aircraft and of the motorized mobile device and of the positioning of the motorized mobile device with respect to the aircraft;
 control the motorized mobile device according to the calculated trajectory.

Thus, the calculated trajectory takes into account the structural characteristics of the aircraft and of the motorized mobile device and allows the latter to not collide with the aircraft.

In one advantageous embodiment, the controller is additionally configured to:
 acquire a datum relating to a state of the aircraft characterizing an operative state of the aircraft for which the motorized mobile device is not allowed to approach, or a parked state of the aircraft for which the motorized mobile device is allowed to approach,
 control the motorized mobile device according to the calculated trajectory if and only if the datum relating to the state of the aircraft equals a parked state.

In a second advantageous embodiment, the motorized mobile device comprises a first communication device or communicator configured to receive a message sent by the aircraft comprising the datum relating to a state of the aircraft.

In a first embodiment, the motorized mobile device comprises an identification marker reader configured to read an identification marker affixed to a fuselage of the aircraft, the identification marker comprising a datum characterizing the category of the aircraft.

In a second embodiment, the motorized mobile device comprises a second communication device or communicator configured to receive a message sent by the aircraft, the message comprising a datum characterizing the category of the aircraft, and the controller is configured to decode the message and identify the category of aircraft.

According to various embodiments, which may be combined with one another:
 the aircraft comprising at least one element that can move between a first configuration and a second configuration and at least one configuration marker comprising a configuration datum characterizing the current configuration of the movable element, the motorized mobile device comprises a configuration marker reader that is able to read the configuration marker and the controller is configured to identify the configuration of the movable element on the basis of the configuration datum and to modify the calculated trajectory according to the configuration datum in order to avoid the motorized mobile device impacting the movable element; and
 the aircraft comprising at least one structural element designed for the motorized mobile device to dock with and at least one target affixed to the fuselage of the aircraft and able to indicate a docking position to the motorized mobile device, the motorized mobile device comprises a target reader and the controller is configured to modify the calculated trajectory on the basis of the target in order to allow the motorized mobile device to dock with the structural element.

Advantageously, the database is held on a remote server and the motorized mobile device comprises a third communication device or communicator for communicating with the server.

Advantageously, the database is held in a memory of the controller.

In one embodiment, the motorized mobile device comprises at least one proximity sensor and the controller is configured to modify the calculated trajectory in the event that the proximity sensor detects an object, in order to avoid the motorized mobile device impacting the object.

BRIEF DESCRIPTION OF THE DRAWINGS

Other features, details and advantages of the disclosure herein will emerge more clearly from the following detailed description, which is given by way of example, with reference to drawings in which.

DETAILED DESCRIPTION

Figure 1:
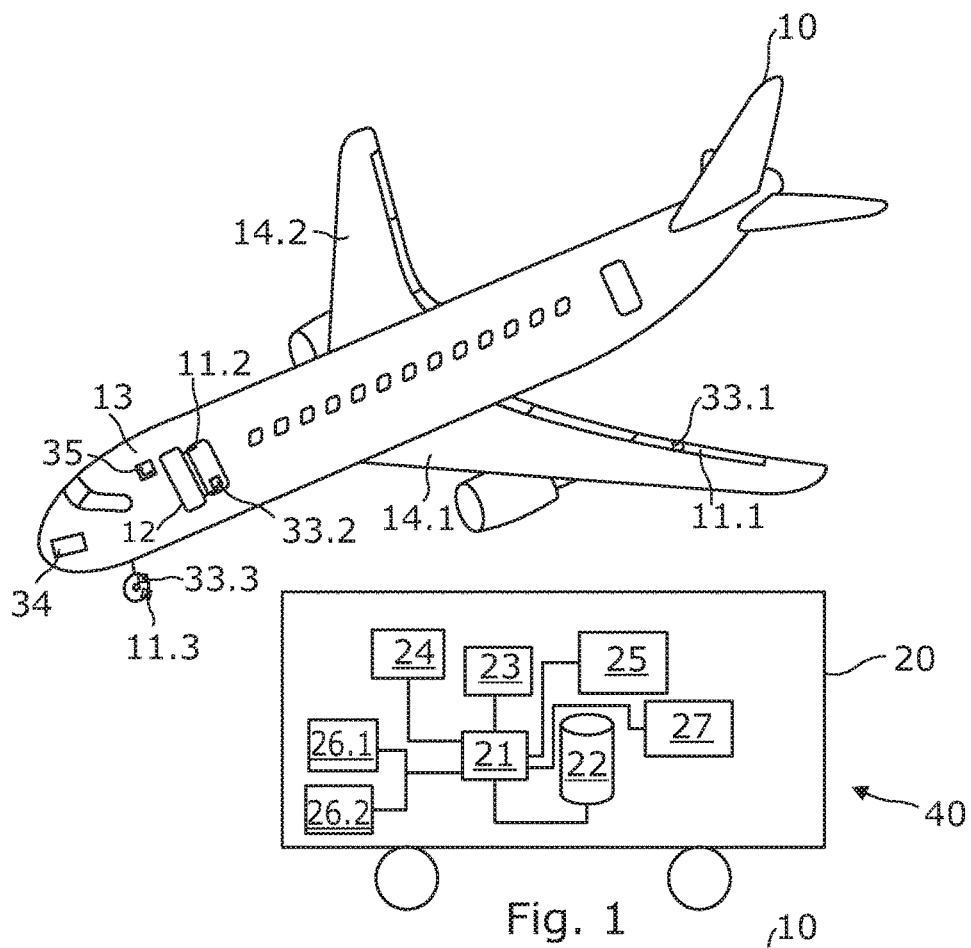
FIG. 1 is a schematic view of an airport system according to a first embodiment of the disclosure herein.

FIG. 1 shows an aircraft 10 parked on an apron of an airport and a schematic view of an anti-collision airport system 40 comprising a motorized mobile device 20 intended to be moved close to the aircraft 10. The aircraft 10 is positioned in a reference system linked to its apron spot. This makes it possible to determine its direction and position on the apron.

Such a system 40 comprises a controller 21 and a database 22 configured to record structural characteristics of aircraft 10 specific to each category of aircraft. Thus, the database 22 comprises one or more records arranged to each store one aircraft category and one or more structural characteristics such as the wingspan, the presence of foldable wing tips, the location of the access doors, the ground clearance of the slats or flaps when these are deployed and retracted, the type of engine, etc. Alternatively or additionally, a database 22 of this kind records one or more numerical models of the aircraft 10 corresponding to one or more configurations of the aircraft 10.

Figure 2:
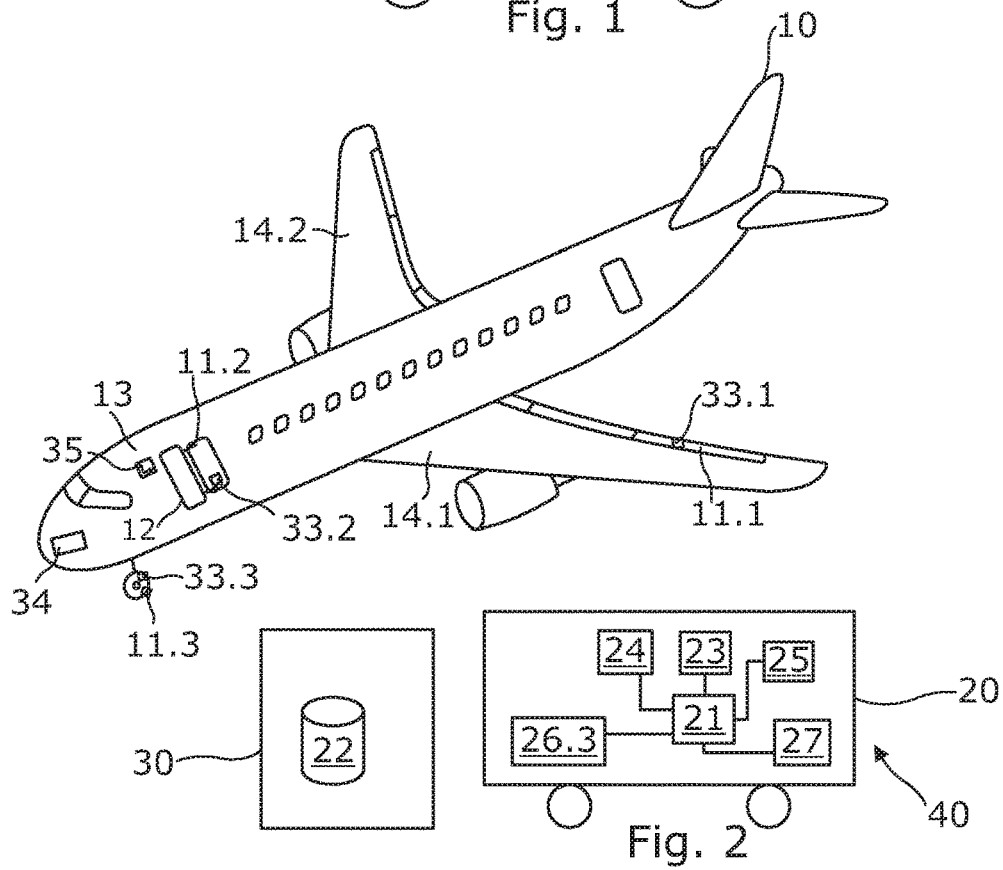
FIG. 2 is a schematic view of an airport system according to a second embodiment of the disclosure herein.

According to a first embodiment, the database 22 is on board the motorized mobile device 20, as depicted in FIG. 1. According to a second embodiment, the database 22 is held on a remote server 30, as depicted in FIG. 2, and the motorized mobile device 20 comprises a communicator 26.3 able to communicate with the server 30.

In addition, the database 22 comprises one or more records that are arranged to each store structural characteristics of the motorized mobile device 20, such as the height of the device 20, the location of one or more sensors or readers, etc. Alternatively or additionally, a database 22 of this kind can record a numerical model of one or more mobile devices 20.

According to one variant, the database 22 is held in a memory of the controller 21.

The controller 21 is configured to identify the category of the aircraft 10. According to a first embodiment, the aircraft 10 comprises a communicator configured to encode and send, to the motorized mobile device 20 or the remote server 30, a message comprising a datum characterizing the category of the aircraft 10, and the motorized mobile device 20 comprises communicator 26.2 configured to receive such a message. According to a second embodiment, the aircraft 10 comprises an identification marker 34 comprising the datum characterizing the category of the aircraft 10. Preferably, the identification marker 34 is not dependent on the aircraft 10 for energy. According to one embodiment, a marker 34 of this kind can be an RFID chip having its own energy source, or a passive RFID chip which operates using the energy provided by a reader. An RFID chip comprises an antenna and an electronic chip which contains at least one item of information, in particular the datum characterizing the category of the aircraft 10. The information contained in the electronic chip is automatically transmitted to a reader when the RFID chip is positioned in a reading zone of the reader. The motorized mobile device 20 comprises an identification marker reader 24, such as an RFID chip reader, for reading the information. According to one variant, the identification marker reader 24 is installed close to the apron spot of the aircraft 10 and comprises a communicator able to transmit the value of the identification datum to the controller 21.

The aircraft 10 comprises a fuselage 13 and two wings 14.1 and 14.2 on either side of the fuselage 13. The identification marker 34 is installed on the fuselage 13 of the aircraft 10 by any attachment. Preferably, the identification marker 34 is affixed at the nose of the aircraft 10, as depicted in FIG. 1. Alternatively, the marker 34 is installed in the structure of the aircraft 10 and is not visible from outside the aircraft 10. For example, the identification marker 34 may be installed inside the radome. According to one variant, the marker 34 is affixed to the wings 14.1, 14.2 or any other location on the aircraft 10 and comprises a datum characterizing the location of the marker 34 on the aircraft 10.

The positioning of the motorized mobile device 20 relative to the aircraft 10 can be determined by any way known to a person skilled in the art. By way of example, when the identification marker reader 24 is on board the motorized mobile device 20, the datum characterizing the location of the marker 34 coupled to the reading field of the identification marker reader 24 makes it possible to determine the position of the motorized mobile device 20 relative to the aircraft 10. The motorized mobile device may moreover be parked on an apron spot close to the apron spot of the aircraft, the position of the apron spot of the motorized mobile device 20 being constant in the reference frame of the aircraft 10.

Alternatively or additionally, the motorized mobile device 20 may comprise a GPS beacon, which serves for orientation within the reference frame of the aircraft.

In operation, each motorized mobile device 20 is assigned one or more missions and a docking position or mission position corresponding to the location that the motorized mobile device must adopt against the aircraft or close to the aircraft in order to carry out its mission. By way of example, a boarding stairs unit may have the mission of moving close to the door 11.2 of the aircraft 10, then docking with the fuselage 13 if the door 11.2 is closed, etc.

In order to determine the docking position, a first step consists in or comprises identifying the category of the aircraft 10. The controller 21 is then configured to search and retrieve, from the database 22, the structural characteristics associated with the category corresponding to the aircraft 10, and to determine the docking position of the motorized mobile device on the basis of the structural characteristics.

In order to calculate a trajectory, the controller 21 determines the positioning of the motorized mobile device 20 relative to the aircraft 10, then calculates a trajectory for the motorized mobile device 20 on the basis of the structural characteristics of the aircraft 10 and the structural characteristics of the motorized mobile device 20. Once the trajectory is calculated, the controller 21 controls the motorized mobile device 20 along the calculated trajectory so as to bring it to its docking position so that it can carry out its mission.

A trajectory of this kind is calculated using techniques which will be known to a person skilled in the art, such that the motorized mobile device 20 does not collide with the aircraft 10, while minimizing the journey time. By way of non-limiting example, if the distance between the fuselage of the aircraft and the ground is greater than the maximum height of a ground support vehicle, the trajectory can be defined to pass beneath the fuselage of the aircraft 10. By contrast, if the distance between the fuselage of the aircraft and the ground is less than the maximum height of the ground support vehicle, the trajectory is defined to go around the aircraft 10.

The aircraft 10 further comprises elements that can move between a first configuration and a second configuration. By way of example, FIG. 1 shows two movable elements, respectively a flap 11.1 positioned on the wing 14.1 of the aircraft 10, the flap 11.1 being able to move between a first configuration in which the flap 11.1 is retracted and a second configuration in which the flap 11.1 is deployed, and a door 11.2, such as an access door or a cargo door which serves to close an access point to the interior of the fuselage 13, the door 11.2 being able to move between a first configuration in which the door 11.2 prevents access to the interior of the fuselage 13 and a second configuration in which the door 11.2 allows access to the interior of the fuselage 13.

A configuration marker 33.1, 33.2 is placed on or close to each movable element 11.1, 11.2. This configuration marker 33.1, 33.2 comprises a configuration datum characterizing the current configuration of the movable element 11.1, 11.2. A marker 33.1, 33.2 of this kind may be an RFID chip serving for writing the current configuration of the movable element 11.1, 11.2. By way of example, the configuration datum may be binary and may take the value "0" when the movable element 11.1, 11.2 is in the first configuration and "1" when the movable element 11.1, 11.2 is in the second configuration.

The motorized mobile device 20 then comprises a configuration marker reader 23, for example an RFID chip reader.

In operation, the motorized mobile device 20 moves along the trajectory calculated by the controller 21. When the configuration marker reader 23 detects the presence of a configuration marker 33.1, 33.2, the reader 23 reads the value of the configuration datum. On the basis of the configuration datum, the controller 21 is configured to identify the configuration of the movable element 11.1, 11.2, to search the database 22 for a record associated with the current configuration of the aircraft 10, and to modify the calculated trajectory on the basis of the configuration datum if the controller 21 determines that the motorized mobile device will impact the aircraft 10. By contrast, if the controller determines that the motorized mobile device 20 will not collide, the trajectory is not modified.

According to one mode of operation, the motorized mobile device 20 may carry out its mission if and only if the aircraft is in a given configuration. For example, in order to be able to dock with the fuselage 13, a boarding stairs unit 20 must ensure that the door 11.2 is closed, or a container loader must ensure that the cargo door is open. In this mode of operation, the controller 21 is configured to acquire one or more configuration data for one or more movable elements 11.1, 11.2 that are specific to a mission of the motorized mobile device 20. During identification of the configuration of the movable element 11.1, 11.2, the controller 21 is configured to compare the value of the read configuration datum to the value of the configuration datum relating to the mission. If the two values are different, the controller 21 is configured to stop the progression of the motorized mobile device along the calculated trajectory until the two values are identical.

According to one variant, and as a safety measure, when the configuration marker reader 23 detects the presence of a configuration marker 33.1, 33.2, the controller 21 may be configured to stop the progression of the motorized mobile device 20 along the calculated trajectory until the controller 21 determines that the motorized mobile device 20 will not impact the aircraft 10.

The aircraft 10 further comprises structural elements 12 designed for a motorized mobile device 20 to dock with. By way of example, a structural element 12 may be an opening 12 in the fuselage 13 allowing access to the interior of the fuselage, the opening 12 being intended for a boarding stairs unit to dock with, an airbridge or a container loader.

Each structural element 12 comprises a target 35 that is able to indicate a docking position to the motorized mobile device 20. The target 35 is affixed to the fuselage 13 of the aircraft close to the structural element 12. In order to read the target, the motorized mobile device 20 comprises a target reader 25. By way of example, the target 35 may comprise a one-dimensional or two-dimensional barcode that encodes a type of structural element 12 and a position of the target 35 relative to the structural element 12. The target reader 25 may be a camera or a barcode reader. Following the acquisition of an image of the target 35 by the target reader 25, the docking position can be deduced by image processing using techniques that will be known to a person skilled in the art. The controller 21 is then configured to modify the calculated trajectory on the basis of the docking position indicated by the target 35, and to allow the motorized mobile device 20 to dock with the structural element 12.

In one particular embodiment, the motorized mobile device 20 comprises at least one proximity sensor 27 that is intended to detect an object located within its field of operation. In response to a detection of an object by the proximity sensor, the controller 21 is configured to modify the calculated trajectory so as to avoid the motorized mobile device 20 impacting the object and more particularly the aircraft 10.

In order to limit the risk of collision with an aircraft 10 and avoid the blast of the engines, a motorized mobile device 20 is generally allowed to move close to the aircraft only if the aircraft 10 is stopped, that is to say if the engines are shut down.

Thus, the aircraft 10 can adopt two states, specifically an operative state in which a motorized mobile device 20 is not allowed to approach, and a parked state in which the motorized mobile device 20 is allowed to approach. In this mode of operation, the controller 21 acquires a datum relating to the state of the aircraft 10 and controls the motorized mobile device 20 according to the calculated trajectory if and only if the datum relating to the state of the aircraft equals a parked state. According to a first alternative, the aircraft 10 is configured to send a message comprising the datum relating to the state of the aircraft 10 and the motorized mobile device 20 comprises communicator 26.1 able to receive such a message. According to a second alternative, which is not shown in the figures, the motorized mobile device 20 comprises microphones intended for listening to and capturing sounds from the sound environment of the motorized mobile device 20 and searching for engine noise in the captured sounds. If the microphones do not detect the presence of engine noise, a datum relating to the state of the aircraft equal to a parked state is sent to the controller 21. According to a third alternative, a parked state is confirmed if the brakes 11.3 have been engaged. The latter can then cooperate with a configuration marker 33.3 comprising the datum of configuration of the brakes and the motorized mobile device 20 can be configured to read, using its configuration marker reader 23, the value of the datum of configuration of the brakes from its parking spot. If the value of the configuration datum signifies that the brakes have been engaged, the controller 21 allows the motorized mobile device 20 to approach.

The configuration markers 33.1, 33.2 and the targets 35 may further comprise an identifier which serves for identifying respectively the movable element 11.1, 11.2 and the structural element 12 with which they are associated.

According to one variant embodiment, the aircraft 10 comprises multiple structure markers, which are not shown in the figures, affixed to the aircraft 10 and encoding a datum characterizing the structure element to which they are affixed. On reading these markers, the motorized mobile device 20 can determine which structure element of the aircraft it is in front of, and can determine its position in the reference frame of the aircraft 10. By way of non-limiting example, markers of this kind may be RFID chips encoding the datum.

According to one embodiment, after the motorized mobile device 20 has read the structure markers, the controller 21 determines the distance between two structure markers, for example a structure marker affixed to a door and a structure marker affixed to a wheel, and deduces the sag and tilt of the aircraft 10.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An anti-collision airport system comprising:
   at least one motorized mobile device configured to be moved close to and dock with an aircraft;
   a database configured to record structural characteristics of categories of aircraft and structural characteristics of the at least one motorized mobile device; and
   a controller for the motorized mobile device, wherein the controller is configured to:
      identify a category corresponding to the aircraft and a positioning of the at least one motorized mobile device with respect to the aircraft;
      search and retrieve, from the database, structural characteristics associated with the category corresponding to the aircraft and structural characteristics of the at least one motorized device;
      calculate a trajectory for movement of the at least one motorized mobile device on a basis of the structural characteristics of the aircraft and of the at least one motorized mobile device and of positioning of the at least one motorized mobile device with respect to the aircraft;
      control the at least one motorized mobile device according to the calculated trajectory; and
      dock the at least one motorized mobile device with the aircraft.

2. The airport system according to claim 1, wherein the controller is configured to:
   acquire a datum relating to a state of the aircraft characterizing an operative state of the aircraft for which the at least one motorized mobile device is not allowed to approach, or a parked state of the aircraft for which the at least one motorized mobile device is allowed to approach; and
   control the at least one motorized mobile device according to the calculated trajectory only when the datum relating to the state of the aircraft equals a parked state.

3. The airport system according to claim 2, wherein the at least one motorized mobile device comprises a first communicator configured to receive a message sent by the aircraft comprising the datum relating to a state of the aircraft.

4. The airport system according to claim 1, wherein the at least one motorized mobile device comprises an identification marker reader configured to read an identification marker affixed to a fuselage of the aircraft, the identification marker comprising a datum characterizing the category of the aircraft.

5. The airport system according to claim 1, wherein the at least one motorized mobile device comprises a second communicator configured to receive a message sent by the aircraft, the message comprising a datum characterizing the category of the aircraft, and wherein the controller is configured to decode the message and identify the category of aircraft.

6. The airport system according to claim 1, wherein the aircraft comprises at least one element movable between a first configuration and a second configuration and at least one configuration marker comprising a configuration datum characterizing current configuration of the movable element, wherein the at least one motorized mobile device comprises a configuration marker reader to read the configuration marker, and wherein the controller is configured to identify the configuration of the movable element on a basis of the configuration datum and to modify the calculated trajectory according to the configuration datum to avoid the at least one motorized mobile device impacting the movable element.

7. The airport system according to claim 1, wherein the aircraft comprises at least one structural element, with which the at least one motorized mobile device is configured to dock, and at least one target, which is affixed to the fuselage of the aircraft and indicates a docking position on the fuselage of the aircraft to the at least one motorized mobile device, wherein the at least one motorized mobile device comprises a target reader, and wherein the controller is configured to modify the calculated trajectory of the at least one motorized mobile device on a basis of the target for the at least one motorized mobile device to dock with the structural element.

8. The airport system according to claim 1, wherein the database is on a remote server and the at least one motorized mobile device comprises a third communicator for communicating with the server.

9. The airport system according to claim 1, wherein the database is in a memory of the controller.

10. The airport system according to claim 1, wherein the at least one motorized mobile device comprises at least one proximity sensor and the controller is configured to modify the calculated trajectory in an event that the proximity sensor detects an object, in order to avoid the at least one motorized mobile device impacting the object.

11. The airport system according to claim 2, wherein the motorized mobile device comprises:
a first communicator, which is configured to receive a first message sent by the aircraft comprising the datum relating to a state of the aircraft; and
a second communicator, which is configured to receive a second message sent by the aircraft comprising a datum characterizing the category of the aircraft, wherein the controller is configured to decode the second message and identify the category of aircraft.

12. The airport system according to claim 11, wherein the motorized mobile device comprises a third communicator configured for communicating with a server, on which the database is stored.

13. The airport system according to claim 1, wherein the motorized mobile device comprises boarding stairs, a baggage dolly, a container loader, or a supply vehicle.

14. The airport system according to claim 1, wherein the at least one motorized mobile device comprises a plurality of motorized mobile devices, each of which comprises a boarding stairs, a baggage dolly, a container loader, or a supply vehicle.

15. An anti-collision airport system comprising:
a motorized mobile device, which is configured to be moved close to an aircraft, wherein the aircraft comprises at least one element movable between a first configuration and a second configuration and at least one configuration marker comprising a configuration datum characterizing current configuration of the movable element;
a database configured to record structural characteristics of categories of aircraft and structural characteristics of the motorized mobile device; and
a controller for the motorized mobile device, wherein the controller is configured to:
identify a category corresponding to the aircraft and a positioning of the motorized mobile device with respect to the aircraft;
search and retrieve, from the database, structural characteristics associated with the category corresponding to the aircraft and structural characteristics of the motorized device;
calculate a trajectory for movement of the motorized mobile device on a basis of the structural characteristics of the aircraft and of the motorized mobile device and of positioning of the motorized mobile device with respect to the aircraft;
acquire a datum relating to a state of the aircraft characterizing an operative state of the aircraft for which the motorized mobile device is not allowed to approach, or a parked state of the aircraft for which the motorized mobile device is allowed to approach; and
control the motorized mobile device according to the calculated trajectory only when the datum relating to the state of the aircraft equals a parked state;
wherein the motorized mobile device comprises a configuration marker reader to read the configuration marker and the controller is configured to identify the configuration of the movable element on a basis of the configuration datum and to modify the calculated trajectory according to the configuration datum to avoid the motorized mobile device impacting the movable element.

16. The airport system according to claim 15, wherein the aircraft comprises at least one structural element, with which the motorized mobile device is configured to dock, and at least one target, which is affixed to the fuselage of the aircraft and indicates a docking position on the fuselage of the aircraft to the motorized mobile device, wherein the motorized mobile device comprises a target reader, and wherein the controller is configured to modify the calculated trajectory of the motorized mobile device on a basis of the target for the motorized mobile device to dock with the structural element.

* * * * *